Figure 1:
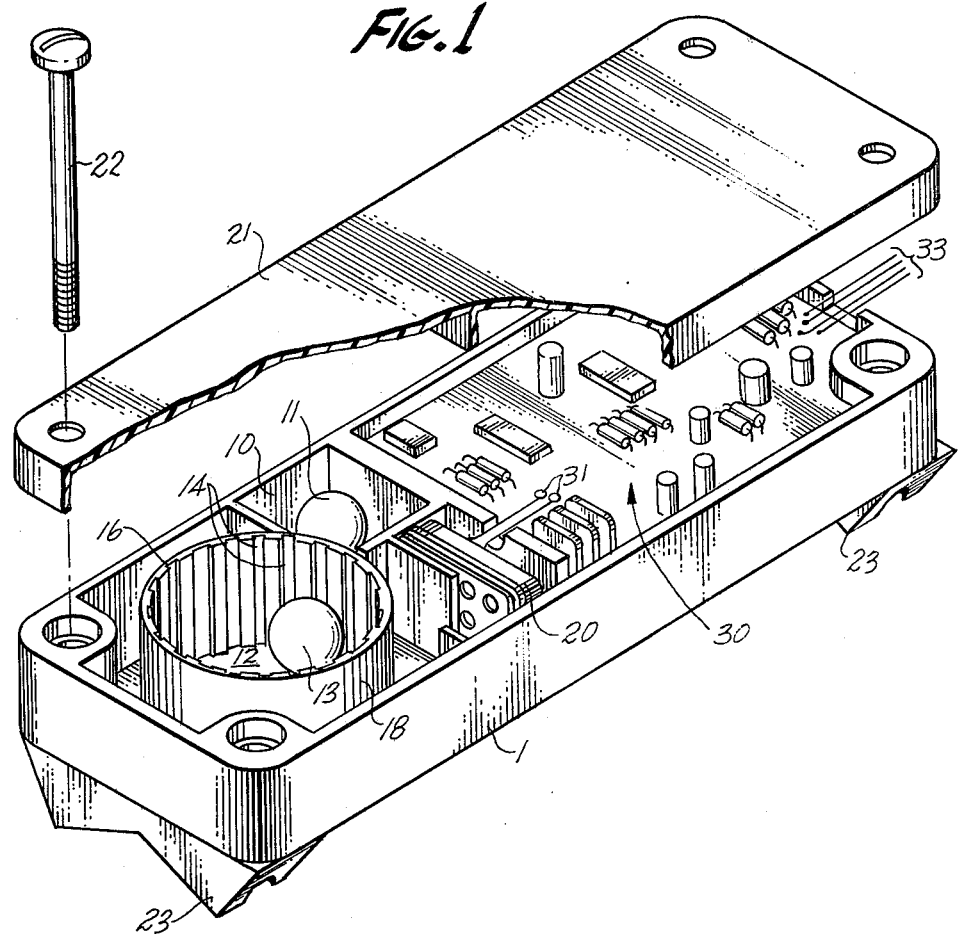

United States Patent [19]

Morgan

[11] 4,322,714
[45] Mar. 30, 1982

[54] VEHICLE ANTI-THEFT ALARM

[75] Inventor: Curtis Morgan, Sunset Beach, Calif.

[73] Assignee: Martek Products, Inc., Santa Ana, Calif.

[21] Appl. No.: 207,458

[22] Filed: Nov. 17, 1980

[51] Int. Cl.³ .................. B60R 25/10; G08B 13/02
[52] U.S. Cl. ............................. 340/65; 340/52 H; 340/566; 340/568
[58] Field of Search .............. 340/52 H, 63, 64, 65, 340/669, 689, 568, 566, 384 R, 384 E

[56] References Cited
U.S. PATENT DOCUMENTS 4,196,429  4/1980  Davis ........................... 340/669

FOREIGN PATENT DOCUMENTS 2755150  6/1979  Fed. Rep. of Germany ........ 340/65

Primary Examiner—Alvin H. Waring
Attorney, Agent, or Firm—Lawrence Fleming

[57] ABSTRACT

An anti-theft alarm system for movable objects, particularly motorcycles, and actuated by mechanical disturbance, e.g., by using tools on a vehicle, moving it off its stand, or operating it. The primary disturbance sensors are steel balls or the like in small compartments inside which they are free to roll. Impacts of one or more balls against compartment walls generate pulses of high-frequency sound and vibration, which are in turn sensed by an adjacent high-frequency microphone or vibration pickup. The output of this transducer is then amplified and suitably processed to energize a horn or other alarm device.

7 Claims, 2 Drawing Figures

VEHICLE ANTI-THEFT ALARM

BACKGROUND

This invention relates to anti-theft devices which actuate an audible or other alarm in response to a mechanical disturbance. In particular it relates to anti-theft alarms for installation on vehicles such as motorcycles and other portable objects where unauthorized movement, i.e., change in attitude and/or acceleration or deceleration, actuates sensitive electrical means that cause an alarm to be actuated.

PRIOR ART

There are known vehicle theft alarms and other alarm systems of the above general type which employ inertia switches such as pendulum switches whose contacts close in response to acceleration of the case or body of the switch. Mercury switches and reed switches have also been arranged for this purpose. They all respond to static magnitudes of vector acceleration, which makes them position-sensitive. Where sensitive pendulum switches are used, there are some difficulties with poor contact due to atmospheric oxidation and contamination of the contact surfaces. Another difficulty with sensitive inertia switches in vehicle theft alarms is that they wear out, because the contacts are continually making and breaking during normal operation of the vehicle on the road; few such devices can pass a prolonged vibration test.

The closest examples of prior art of which I am aware are the following U.S. patents on switch-type alarms of the above general kind:

(AA) Eversull, U.S. Pat. No. 3,659,265. Automobile theft alarm controlled by a pendulum switch.

(AB) Joens et al., U.S. Pat. No. 3,668,675. Automobile theft alarm controlled by pendulum switch of different construction.

(AC) Hamann et al., U.S. Pat. No. 3,721,956. Bicycle theft alarm; an inertia switch sounds a horn.

(AD) Adamo, U.S. Pat. No. 4,013,995. Automobile or bus theft alarm controlled by reed-type inertia switch.

(AE) Krause et al., U.S. Pat. No. 4,167,733. Burglar alarm using an "ultra-sensitive, gravity-responsive" switch (FIG. 5) which employs a pool of mercury.

None of the above art shows the present principle of a disturbance sensor that produces small mechanical impacts in response to acceleration, then senses the impacts acoustically or by high-frequency vibration.

STATEMENT OF INVENTION

A vehicle theft alarm is actuated in response to rattling, i.e., mechanical impacts of loose steel balls or the like against the walls of small enclosures. Such impacts or rattling occur in response to changes in attitude or acceleration of the vehicle, such as taking a motorcycle off of its stand, and/or accelerating or decelerating it. The little impacts are sensed by a suitable microphone or vibration pickup made sensitive mainly to the higher audible frequencies and the ultrasonic range. The electrical output of the pickup or transducer feeds electronic circuitry whose final output actuates an audible alarm such as a horn.

It is well-known that sharp impacts or rattling between hard objects (such as the jingling of a bunch of keys) generate strong ultrasonic sound waves as well as high-frequency vibration. The effect is widely used for example in remote controls for home television sets, where small hammers impact the ends of metal rods resonant, typically, in the region around 40 KHz.

In the present invention, the rattling of the balls or the like striking the walls of their enclosures may be sensed by a simple ultrasonic microphone of the type used in television set remote controls. Alternatively a simple piezoelectric accelerometer may be used to sense the high-frequency components of the vibration produced by the impacts.

With current solid-state technology the electrical output signal of either type of transducer may be cheaply processed by amplifier, detector, latching, or other suitable circuits to actuate a loud horn or other suitable alarm.

DESCRIPTION

Figure 2:
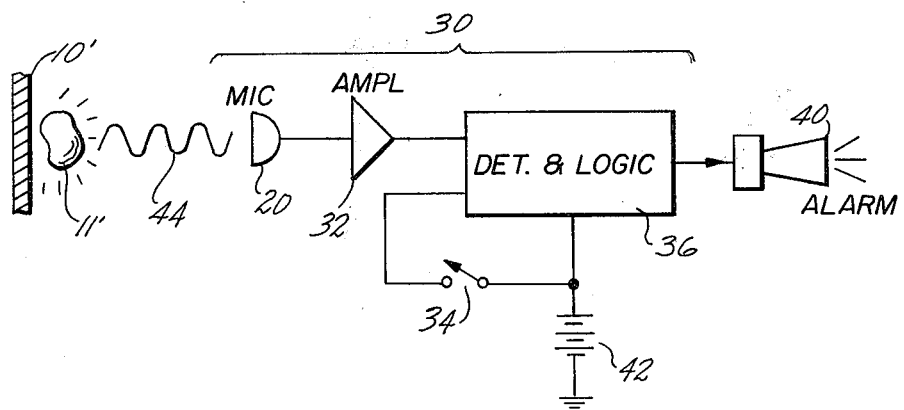

IN THE DRAWING:

FIG. 1 is a perspective view of the sensing and control assembly of a vehicle anti-theft alarm according to the invention; and FIG. 2 is a block schematic diagram to a complete alarm system.

Referring to FIG. 1, the sensing and control assembly is preferably built into a housing or case 1, which may conveniently be molded of a plastic compound, with a removable cover 21. Case 1 is shown as shaped to be conveniently clamped to the frame of a motorcycle, with integral mounting lugs 23 having V-shaped portions suitable for clamping onto a tubular frame member. They may be held on by straps, not shown, or secured by long screws such as indicated at 22.

An electronic circuit board indicated generally at 30 occupies part of the case or housing 1; the details of its circuitry do not form part of the invention.

Mechanical disturbance of the vehicle to which housing 1 is attached is first sensed by the rolling of loose balls 11 and/or 13. As the balls, which may be ordinary steel balls about 1 cm in diameter, roll against and impact the side walls of their enclosures, the impacts generate pulses of sound, most strongly in the ultrasonic range. These acoustic pulses are picked up by the nearby microphone or other transducer 20, whose electrical signal output leads are connected to input terminals 31 on circuit board 30. There, the signal is suitably amplified and processed in known manner. Transducer 20 may be an ultrasonic microphone of any suitable type, as the kind used in remote controls for home television sets; or it may be a piezoelectric high-frequency vibration pickup or accelerometer.

From the circuit board 33 go suitable leads 33 to the vehicle battery, the ignition switch, and to a horn or other suitable alarm means such as a radio transmitter. The circuitry on board 30 is preferably designed in known manner to perform the following functions:

(1) Amplify the "rattle pulse" output of transducer 20 to a level suitable for rectification and integration to produce a d-c control signal, e.g. to about one volt or a few volts;

(2) Close a solid-state or other type relay in response to this control signal, to actuate an alarm.

(3) Perform the following logic and time delay functions:

(a) Arm (i.e., become operative to actuate the alarm) about 60 seconds after the ignition switch has been turned OFF after having been ON for at least about 15 seconds; and (b) Disarm when ignition switch is turned OFF after having been ON for less than about 15 seconds.

Thus in normal use for protecting an unattended vehicle the system will arm about 60 seconds after the ignition has been turned off. In order to prevent the alarm from operating during brief stops, as for fuel, the rider merely turns the ignition switch OFF, then ON-OFF.

FIG. 2 shows the system in block form. A striker 11' of substantial mass is disposed so as to be free to move to strike or impact a relatively hard surface 10' e.g., when surface 10 undergoes acceleration, toward striker 11; the striker tends to remain behind due to its inertia, and so there is an impact. The sound or vibration produced by the impact is converted into a generally analogous electrical signal by transducer 20. Sound or vibration waves are indicated at 44. This signal is amplified by an amplifier 32 and further processed in the manner described above in the circuitry indicated generally as a block 36. The vehicle battery is indicated at 42, the ignition switch at 34, and a horn or other alarm device at 40. While the striker element 11' may be of any suitable size and shape, guided or suspended in any suitable manner, it is preferably a steel or other hard ball as at 11, 13 in FIG. 1, free to roll about in a small enclosure or compartment or cavity as at 10, 12.

According to the invention, it is preferable to use two separate and different ball-and-enclosure elements, FIG. 1. Ball 11 in the generally cubical enclosure 10 (more broadly a parallelepiped) is the better suited for sensing a change in the attitude of the vehicle, as from taking a motorcycle off its stand. The case or housing 1 is preferably installed on the vehicle, so oriented that this amount of tilting would cause ball 11 to roll from one side to the other of "box" or enclosure 11.

The additional element that includes ball 13 in circular enclosure or space 12 is the more effective in sensing linear acceleration and deceleration during forward motion of the vehicle—which cause ball 13 to roll in an arcuate path along the inside if wall 16 that bounds the space 12. Wall 16 has internal protrusions or ribs 14, like internal splines, all around it. As ball 13 rolls around against wall 16, it gets a "bumpy ride", creating many small impacts to be sensed by transducer 20.

The walls of both compartments or enclosures 10, 12 are made rather thin, with spaces as 18 outside, to facilitate the generation of sound waves by the impacts of balls 11, 13, via a "sounding board" effect.

The application of ordinary tools such as screwdrivers, hammers, and wrenches to a vehicle produce small impacts which generate high-frequency acoustic pulses that propagate through the metal structure of the vehicle with substantial intensity. The case or housing 1 and its mounting lugs or blocks 23, which are preferably integral, are made to facilitate the conduction of such tool-originated sound to the microphone or other transducer 20. The V-like reentrant surfaces of mounting lugs 23 are preferably clamped directly onto a tubular frame member of a motorcycle. When case 1 is so mounted, it is found that the alarm will sound reliably when such tools are used on the vehicle, even though the vehicle is not actually moved; thus attempts to defeat the system are thwarted.

In this specification the term "acceleration" is used in the vectorial sense and includes gravitation: thus a change in attitude in pitch or roll is a change in acceleration. The term, "high-frequency mechanoelectric transducer" is used to mean either a microphone or a vibration pickup sensitive in the upper audio and ultrasonic frequency range; it is assumed that frequencies below several KHz, which are associated with traffic noise and vibration, are generally excluded either in the transducer or in the following circuitry. The term, "inertia controlled" as applied to the generalized striker 11', FIG. 2, or its embodiments as the ball 11 or 13 in FIG. 1, means that the striker is guided or supported with enough freedom to move to permit it to strike an adjacent compartment wall under the influence of inertia forces of a small fraction of a g.

I claim:

1. An alarm system for a movable object and responsive to its acceleration, comprising:
   a housing with means to attach it to said object;
   a first cavity in said housing, and having walls and a striker of hard material, free to move inside said cavity to produce impacts on the wall thereof in response to acceleration of said housing, said impacts generating high-frequency sound and vibration inside said housing;
   a transducer in said housing disposed so as to sense said sound or vibration and having electrical output terminals connected to the input of an amplifier; and
   control circuitry comprising signal-processing and relay circuits fed from the output of said amplifier and having output terminals connected so as to actuate an alarm in response to said impacts.

2. A system as in claim 1, wherein said first cavity is shaped generally as a circular cylinder with protrusions on its inside curved wall, and said striker is a ball free to roll around therein, said ball generating said impacts as it rolls over said protrusions.

3. A system as in claim 1, wherein said first cavity is generally as a polygonal prism, said ball rolling therein and striking the walls thereof to generate said impacts.

4. A system as in claim 2, further comprising a second cavity shaped as a polygonal prism, and a second striker shaped as a ball and free to roll therein to impact the walls thereof.

5. A system as in claim 4, wherein said cavities have thin walls disposed to act in the manner of sounding boards, and said transducer is a microphone disposed inside said housing and near the outside surfaces of said walls, to sense acoustic pulses generated by said impacts.

6. A system as in claim 4 wherein: said housing is adapted to be clamped to a tubular frame member of a motorcycle; and wherein said control circuitry comprises: a transducer signal preamplifier, a detector, time delay and logic circuits, and a solid state relay, and wherein said alarm is an audible sound generator; and further comprising actuating connections from said sound generator to said relay and to the battery of said motorcycle.

7. A system as in claim 6, further comprising: interconnections between said time delay and logic circuits and the ignition switch of said motorcycle to arm and disarm said system according to the following sequence:
(a) Ignition turned ON for longer than about 15 seconds and then OFF: system arms after about 60 seconds; and
(b) Ignition switch ON for less than about 15 seconds, then OFF: system disarms.

* * * * *